US 8,085,277 B2

(12) United States Patent
Schoner

(10) Patent No.: US 8,085,277 B2
(45) Date of Patent: Dec. 27, 2011

(54) SYSTEM AND METHOD FOR CLIPPING VALUES OF PIXELS IN ONE COLOR SPACE SO NOT TO EXCEED THE LIMITS OF A SECOND COLOR SPACE

(75) Inventor: Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 402 days.

(21) Appl. No.: 10/968,416

(22) Filed: Oct. 19, 2004

(65) Prior Publication Data
US 2005/0168477 A1 Aug. 4, 2005

Related U.S. Application Data

(60) Provisional application No. 60/540,699, filed on Jan. 30, 2004.

(51) Int. Cl.
G09G 5/02 (2006.01)
(52) U.S. Cl. ......................... 345/590; 345/604
(58) Field of Classification Search .................. 345/590, 345/604
See application file for complete search history.

(56) References Cited

U.S. PATENT DOCUMENTS

| 5,233,684 | A | * | 8/1993 | Ulichney | 345/604 |
| 5,732,205 | A | * | 3/1998 | Astle | 345/590 |
| 5,818,613 | A | * | 10/1998 | Masterson et al. | 358/520 |
| 5,867,169 | A | * | 2/1999 | Prater | 345/604 |
| 5,946,113 | A | * | 8/1999 | Pritchett | 358/520 |
| 6,326,977 | B1 | * | 12/2001 | Westerman | 345/591 |
| 6,510,242 | B1 | * | 1/2003 | Westerman | 382/162 |
| 6,707,459 | B1 | * | 3/2004 | Graves et al. | 345/604 |
| 6,735,334 | B2 | * | 5/2004 | Roberts | 382/167 |
| 6,825,853 | B2 | * | 11/2004 | Jiang et al. | 345/604 |
| 7,057,671 | B2 | * | 6/2006 | Dumitras et al. | 348/649 |
| 7,129,957 | B2 | * | 10/2006 | Kim | 345/603 |
| 7,130,462 | B2 | * | 10/2006 | Nakami | 382/166 |
| 2003/0052895 | A1 | | 3/2003 | Akiyama et al. | |
| 2003/0072015 | A1 | * | 4/2003 | Fujino | 358/1.9 |
| 2003/0184559 | A1 | | 10/2003 | Jiang et al. | |
| 2004/0207882 | A1 | * | 10/2004 | Ahmed et al. | 358/3.26 |
| 2005/0031199 | A1 | * | 2/2005 | Ben-Chorin et al. | 382/162 |
| 2009/0085924 | A1 | * | 4/2009 | Ben-Chorin et al. | 345/591 |

FOREIGN PATENT DOCUMENTS

| EP | 1 333 684 | 8/2003 |
| JP | 2003092690 A * | 3/2003 |
| JP | 2005252393 A * | 9/2005 |

OTHER PUBLICATIONS

European Search Report for European Patent Application No. 05000719.4-2202, dated Dec. 18, 2009.
Devereux, "Limiting of YUV Digital Video Signals," BBC Research and Development Report, No. 22, Dec. 1, 1987, pp. 1-16, XP002110254.
Morovic et al., "The Fundamentals of Gamut Mapping: A Survey." Journal of Imaging Science and Technology, vol. 45, No. 3, May 1, 2001, pp. 283-290, XP008017721.

* cited by examiner

*Primary Examiner* — Daniel Washburn
(74) *Attorney, Agent, or Firm* — McAndrews, Held & Malloy, Ltd.

(57) ABSTRACT

A system and method that detects when pixels from one color space would exceed the range of a second color space, and restrict the range of the pixels without distorting their brightness, while preserving their color. The method may provide the ability to restrict the range of pixels in the first color space that may ordinarily transform to "illegal" values with erroneous brightness in the second color space, to a sub-space containing the entire second color space, while preserving the brightness of the pixels. The parameters used to define the sub-space may be programmable. The first color space may be $YC_rC_b$ and the second color space may be RGB.

20 Claims, 4 Drawing Sheets

SYSTEM AND METHOD FOR CLIPPING VALUES OF PIXELS IN ONE COLOR SPACE SO NOT TO EXCEED THE LIMITS OF A SECOND COLOR SPACE

RELATED APPLICATIONS

This patent application makes reference to, claims priority to and claims benefit from U.S. Provisional Patent Application Ser. No. 60/540,699, entitled "YCrCb to RGB Color Clip," filed on Jan. 30, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video processing, transmitted video is almost always represented in a three-dimensional color space. Video may be represented in the $YC_rC_b$, where Y is the luminance or brightness component and $C_r$ and $C_b$ are the chrominance or color components. Video may also be represented in the RGB color space, where R is the red color component, G is the green color component, and B is the blue color component. While most video processing applications are in $YC_rC_b$ space, most televisions displays utilize the RGB color space. Thus, when a television receives a transmission that in the $YC_rC_b$ space, a conversion may take place to the RGB space. However, the $YC_rC_b$ color space is larger than the RGB color space. If the $YC_rC_b$ and the RGB color spaces were to be represented by cubes, the RGB cube would be entirely inside the $YC_rC_b$ cube. Colors that are in the $YC_rC_b$ color space, but that are outside the RGB color space are referred to as "out-of-gamut" and are not valid colors to the human eye. Conventional video processing can lead to generating colors that are out-of-gamut. One way of resolving this issue and transforming an out-of-gamut color space to an in-gamut color space is by "clipping" the out-of-gamut colors that are out of the RGB color space.

FIG. 1 illustrates a block diagram of a projection of a valid RGB cube to a ($C_r$, Y) plane. For a given Y value, many $C_r$ values are out-of-gamut. Also, Y values in the range [0,16] or [235,255] have $C_r$=0, and in the $YC_rC_b$ color space, pixels with a Y value above 235 appear white, and pixels with a Y value below 16 appear black. If a pixel outside the RGB gamut is converted to RGB with a standard matrix conversion, values will exceed the legal RGB ranges of [0,255]. As an example, an out-of-gamut value of $YC_rC_b$ =[16, 0, 0] converts to RGB=[neg, 154, neg]. If the negative values are simply clipped to zero, the resulting color is bright green. But (Y==16) should result in black. The problem in converting from the $YC_rC_b$ color space to the RGB color space is that a color that is represented by $YC_rC_b$ may not fall within the RGB cube, and a decision needs to be made on what the television is supposed to display using RGB representation.

After converting $YC_rC_b$ =[16, 0, 0] to RGB=[neg, 154, neg], the negative values may be easily clipped. However, the positive green value has substantially increased. Clipping the negative values, therefore, may not preserve luminance and may instead add positive luminance to the output. Thus, a pixel with a luminance of 16, which may have a color very close to black, when clipped to the RGB cube, ends up much brighter than it should be. Similarly, pixels in the region outside the RGB cube and above the line where the luminance is 235 should be white, but with clipping them to the RGB cube, the pixels end up with a color instead of being white, is an off-white color. The white pixels may become a little green or red or gray, but not white. Clipping causes noticeable artifacts around objects on the TV screen, especially, around the black and the white regions where other colors leak in.

Clipping may work moderately when the clipping produces a small error. However, clipping causes problems when large errors result such as, for example, when a pixel falls in the black and white regions, where Y values are below 16 and above 235, respectively. Because many video devices output $YC_rC_b$ signals directly, a method is desired to keep the $YC_rC_b$ values in a legal range, without the complexity of converting to the RGB space, clipping, and then converting back to $YC_rC_b$. In addition, simply "clipping" the out-of-gamut values back to the RGB space is acceptable for small excursions, but it can cause visible distortion for signals that are far out-of-gamut. The eye is most sensitive to luminance than hue, and least sensitive to saturation. As a result, it is most favorable to preserve luminance, and sacrifice saturation.

Although it is possible to accurately limit saturation to a color space, mathematically precise methods involve coordinate transforms that can be prohibitively expensive for low-cost applications. Because small excursions and small changes to hue are not objectionable, it is desirable to have an approximate solution with reasonable quality at a low cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that keeps pixels from a first color space in the range of a second color space, wherein pixels have a color and brightness, and where the brightness of the restricted pixels is preserved. The method may comprise detecting when pixels in the first color space exceed the range of pixels in the second color space, and restricting the pixels in the first color space to the range of the second color space. Detecting when pixels in the first color space exceed the range of pixels in the second color space may comprise defining a sub-space within the first color space using a set of parameters, and determining whether a pixel is outside the sub-space, or inside the sub-space, wherein the sub-space approximates the range of the second color space. The set of parameters defining the sub-space may be programmable.

When a pixel is inside the sub-space, the method may comprise keeping the pixel unchanged, wherein the pixel inside the sub-space has brightness and color that do not visually deviate when mapped to the second color space.

Whenever a pixel is located outside the sub-space, that pixel may be forced to a new pixel inside the sub-space, wherein the brightness and color of the new pixel is not visually deviated from the brightness and color of the pixel from the first color space, and wherein the new pixel inside the sub-space has brightness and color that do not visually deviate when mapped to the second color space.

The system comprises at least one processor capable of performing the method that keeps pixels from a first color space in the range of a second color space, wherein pixels have a color and brightness, and where the brightness of the restricted pixels is preserved.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to processing of video signals. More specifically, certain embodiments of the invention relate to a method and system that performs adequate color clipping to preserve luminance of pixels in the $YC_rC_b$ color space to restrict the pixels to a valid range in the RGB color space by detecting when the pixels in the $YC_rC_b$ color space would exceed the range (or gamut) of the RGB color space. Although the following discusses the invention in terms of the $YC_rC_b$ color space and the RGB color space, it should be understood that the following may be applied to other color spaces such as, for example, YIQ, $YP_rP_b$, YUV, etc.

Figure 1:
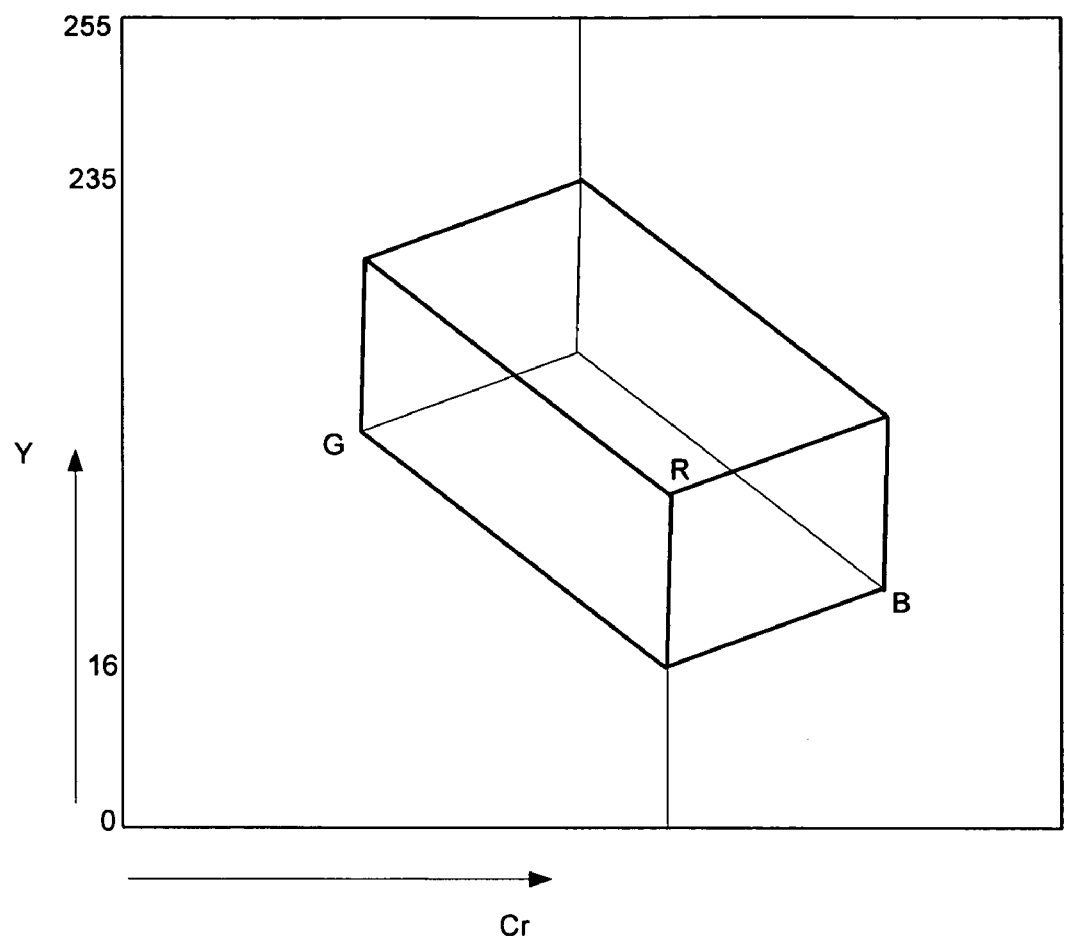
FIG. 1 illustrates a block diagram of a projection of a valid RGB cube to a $(C_r, Y)$ plane.
Figure 2:
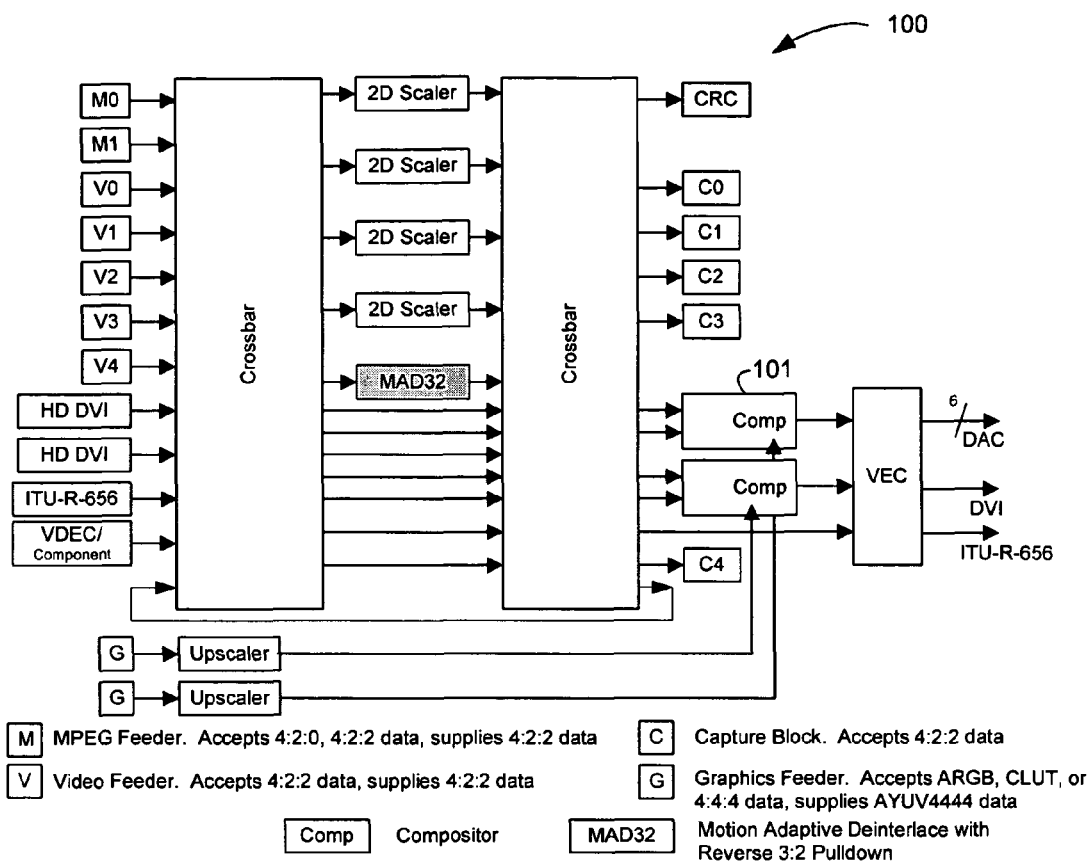
FIG. 2 illustrates an exemplary video network system having a color clip circuit, in accordance with an embodiment of the present invention

FIG. 2 illustrates an exemplary video network system 100 having a color clip circuit, in accordance with an embodiment of the present invention. The color clip circuit may be located in the compositor (comp) block 101.

Figure 3:
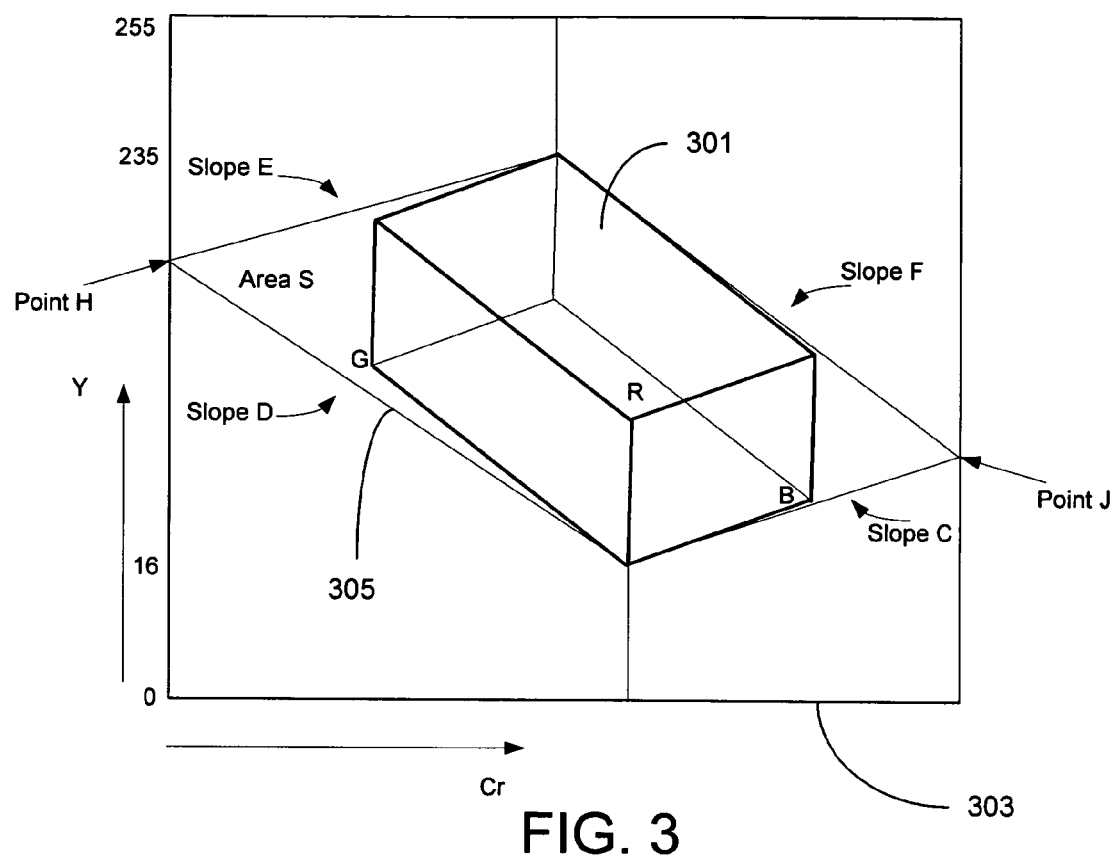
FIG. 3 illustrates a block diagram of an exemplary projection of a RGB color cube to the Y-Cr plane in the YCrCb color space, in accordance with an embodiment of the present invention.

FIG. 3 illustrates a block diagram of an exemplary projection of a RGB color cube to the Y-Cr plane in the YCrCb color space, in accordance with an embodiment of the present invention. A RGB cube 301 may be projected to a $(C_r, Y)$ plane 303, where the $C_r$ values may be bound to the designated Area S 305, thus effectively clipping the $YC_rC_b$ color space to a RGB color space. The designated area S 305 may be bounded by slopes C, D, E and F and points H and J.

Figure 4:
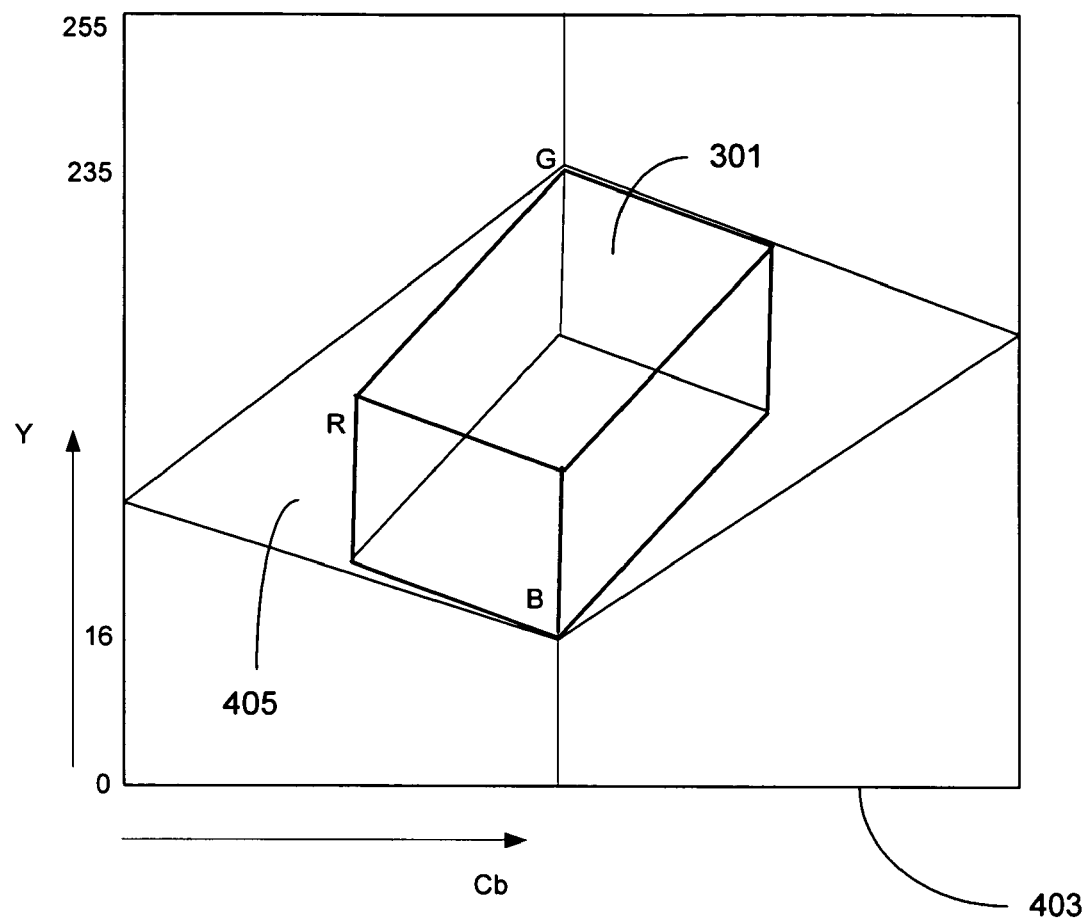
FIG. 4 illustrates a block diagram of an exemplary projection of a RGB color cube to the Y-Cb plane in the YCrCb color space, in accordance with an embodiment of the present invention.

FIG. 4 illustrates a block diagram of an exemplary projection of a RGB color cube to the Y-Cb plane in the YCrCb color space, in accordance with an embodiment of the present invention. The RGB cube may also be projected to the $(C_b, Y)$ plane 403, in a similar manner as the projection to the $(C_r, Y)$ plane 303, where the $C_b$ axis is perpendicular to the $(C_r, Y)$ plane 303. The $C_b$ values may be bound to a designated region 405, but with different slopes and a different point. As a result, the whole RGB cube 301 may be contained within a $YC_rC_b$ space defined by the slopes C, D, E, and F, and points H and J, and the slopes and points in the $(C_b, Y)$ plane. In alternative embodiments of the present invention, different color spaces may have different projections and may be approximated by different slopes and points.

A pixel may have a $(YC_rC_b)$ value inside the RGB color space 301, which would be valid and may not be affected by the transformation from one color space to the other. However, another pixel may have a $(YC_rC_b)$ value outside the RGB cube 301. If a pixel is outside the legal RGB cube, it may be desirable to correct the pixel in a way that preserves luminance. Hence, if the pixel is white or black, the correction may ensure that it remains white or black, respectively. Area S (305 for Cr, and 405 for Cb) may only be an approximation of the true RGB gamut (301). An embodiment of the present invention may only perform a partial correction to area S. The approximate correction may not be exact, but it may be close enough to give visually acceptable performance. Also, the approximation error may be very small in the black and white regions (regions where the Y values are below 16 and above 235) where errors may be most noticeable.

While the following derivations and calculations may derive parameters for standard definition (SD) television as define in ITU Rec. 601, the parameters in an embodiment of this invention may be programmable for operation with a wide variety of color spaces that may be used in the video industry.

In accordance with an embodiment of the present invention, restricting pixels in the $YC_rC_b$ color space to the range of the RGB color space may be calculated as follows:

Let $Y'=(Y-16)$, $C_b'=(C_b-128)$, $C_r'=(C_r-128)$ $R=1.164\ Y'+1.596\ C_b'$ $G=1.164\ Y'-0.813\ Cb'-0.391\ C_r'$ $B=1.164\ Y'+2.018\ C_r'$ $Y'=0.257*R+0.504*G+0.098*B$

Negative clips may be avoided by keeping R, G, and B from clipping negative. Whenever R<0, this implies 1.596 V'<−1.164 Y'. The rule may be, therefore, that in order to keep R from clipping negative, the following must be true for $C_b'$: $C_b'$>−1.164/1.596 Y'=−0.729 Y'.

In order to keep B from clipping negative, the following relationship may be satisfied for $C_r'$: $C_r'$>−1.164/2.018 Y'=−0.577 Y'.

If $K=2C_b'+C_r'$, it may be approximated that G=1.164Y'−0.4K. In this embodiment, therefore, the rule may be that, in order to keep G from clipping negative and greater than zero, it must be true that K<2.91 Y'.

Since it may be difficult to correct green clips and preserve hue, $C_r$ and $C_b$ values may be measured independently. G=1.164Y'−0.813$C_b'$−0.391$C_r'$>0. Since $C_b'$>−0.729Y', therefore 1.164Y'+0.813(0.729)Y'−0.391$C_r'$>0 and $C_r'$>4.493V'. Similarly, 1.164Y'−0.813V'+0.391(0.577)Y'>0 and $C_r'$>1.709Y'.

Positive clips may be adjusted as follows.

Let $Y^*=219-Y' \rightarrow Y'=219-Y^*$

Any equation that begins with "255=1.164Y'+ . . . " may be re-written as "0=1.1643638(219−Y*)−255+ . . . " Or, "0=1.164Y*+ . . . ". The value of R may be restricted from exceeding 255 by solving the equation 1.164Y*+1.596 $C_b'$<0. Therefore, the value of R may be restricted from exceeding 255 if $C_b'$<0.729 Y*. The same type of equations may be applied to all other positive clips.

In another embodiment of the present invention, the high definition (HD) television coefficients, as defined in ITU Rec. 709, may be calculated as follows.

$$R = 1.164\ Y' + 1.793\ C_r'$$

$$G = 1.164\ Y' - 0.534\ C_b' - 0.213\ C_r'$$

$$B = 1.164\ Y' + 2.115\ C_b'$$

$$Y' = 0.183*R + 0.614*G + 0.062*B$$

$$C_b' > -1.164/1.793\ Y' = -0.649\ Y'$$

$$C_r' > -1.164/2.15\ Y' = -0.550\ Y'$$

$$1.164Y' - 0.534C_b' - 0.213C_r' > 0$$

$$Cr' > (1.164Y' + 0.534*0.649Y')/0.213 = 7.09\ Y'$$

$$Cb' > (1.164Y' + 0.213*0.550Y')/0.534 = 2.40\ Y'$$

A color clip block in accordance with an embodiment of the present invention may be adapted so that it may be enabled/disabled at any time without causing a discontinuity in an associated display. Separate enables may be available for positive and negative clipping. In addition, the slopes C, D, E, and F, and points H and J in the ($C_r$, Y) plane, and similar slopes and points for the ($C_b$, Y) plane, may be programmable.

A $YC_rC_b$ to RGB color clip may be implemented with pseudo-code, requiring one multiply for $C_r$, one multiply for $C_b$ and adders. Multiplier coefficients may be 10 bits. The pseudo-code may be as follows:

```
void clip(y,u,v) {
    ty = MAX(*y, 16) - 16; // note that y has a useful range of 16-235
    tyx = 219.0 - ty;
    if (tyx < 0.0) {tyx = 0.0;}
    tu = u - 128;
    tv = u - 128;
    ty += 0.5;
    tyx += 0.5;
    // clip U
    if (tu > 0) {
        if (ty < 25) { // "25" is point "J" in FIG. 2
            if (tu > (4.5 * ty))        {tu = 4.5 * ty;} // slope A
        }
        else {
            if (tu > (0.58 * tyx)) (tu = 0.58 * tyx;} // slope B
        }
    }
    else {
        if (tyx < 25) {
            if (-tu > (4.5 * tyx))      (tu = -4.5 * tyx;}
        }
        else {
            if (-tu > (0.58 * ty))      {tu = -0.58 * ty;}
        }
    }
    // clip V is similar to U, with different coefficients
    {...}
    u = tu + 128;
    v = tv + 128;
}
```

Accordingly, the present invention may be realized in hardware, software, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system such that it carries out the methods described herein. In a computer system, a processor and a memory unit may be utilized to achieve the methods described herein.

The present invention may also be embedded in a computer program product, which may comprise all the features enabling the implementation of the methods described herein, and which when loaded in a computer system may be able to carry out these methods. A computer program in the present context may mean any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that keeps pixels from a first color space in the range of a second color space, wherein the pixels have a color and brightness, the method comprising:
   detecting when pixels in the first color space exceed the range of pixels in the second color space with a circuit;
   restricting the pixels in the first color space to the range of the second color space;
   defining a sub-space within the first color space using a set of parameters; and
   determining whether a pixel is outside the sub-space or inside the sub-space, wherein the sub-space approximates the range of the second color space and comprises values from the first color space that are outside the second color space; and
   wherein defining the sub-space within the first color space further comprises determining values in the first color space that correspond to the boundaries of the sub-space comprising values from the first color space that are outside the second color space.

2. The method according to claim 1 wherein the restricting comprises, when a pixel is inside the sub-space keeping the pixel unchanged, wherein the pixel inside the sub-space has brightness and color that do not visually deviate when mapped to the second color space.

3. The method according to claim 1 wherein the restricting comprises, when a pixel is outside the sub-space:
   forcing the pixel to a new pixel in the sub-space, wherein the brightness and color of the new pixel is not visually deviated from the brightness and color of the pixel from the first color space; and
   wherein the new pixel inside the sub-space has brightness and color that do not visually deviate when mapped to the second color space.

4. The method according to claim 1 wherein the set of parameters is programmable.

5. The method of claim 4, wherein the sub-space in the first color space is larger than a unit cube in RGB color space.

6. The method according to claim 1 wherein the first color space is YCrCb color space.

7. The method according to claim 1 wherein the second color space is RGB color space.

8. The method of claim 1, wherein if the pixel is outside the sub-space, clipping the pixel to the sub-space.

9. The method of claim 1, wherein the sub-space in the first color space is larger than a unit cube in RGB color space.

10. A system that keeps pixels from a first color space in the range of a second color space, wherein pixels have a color and brightness, the system comprising:
at least one processor capable of detecting when pixels in the first color space exceed the range of pixels in the second color space;
the at least one processor capable of restricting the pixels in the first color space to the range of the second color space; and
wherein brightness of the restricted pixels is preserved, wherein the at least one processor:
defines a sub-space within the first color space using a set of parameters, wherein defining the sub-space within the first color space further comprises determining values in the first color space that correspond to the boundaries of the sub-space; and
determines whether a pixel is outside the sub-space or inside the sub-space, wherein the sub-space approximates the range of the second color space and comprises values from the first color space that are outside the second color space; and
wherein the sub-space in the first color space is larger than the unit cube in RGB color space.

11. The system according to claim 10 wherein, the at least one processor keeps the pixel unchanged when the pixel is inside the second color space, wherein the pixel inside the sub-space has brightness and color that do not visually deviate when mapped to the second color space.

12. The system according to claim 10 wherein, when a pixel is outside the sub-space, the at least one processor:
forces the pixel to a new pixel in the sub-space, wherein the brightness and color of the new pixel is not visually deviated from the brightness and color of the pixel from the first color space; and
wherein the new pixel inside the sub-space has brightness and color that do not visually deviate when mapped to the second color space.

13. The system according to claim 10 wherein the first color space is YCrCB color space.

14. The system according to claim 10 wherein the second color space is RGB color space.

15. The system of claim 10, wherein if the pixel is outside the sub-space, clipping the pixel to the sub-space.

16. A memory having stored thereon, a computer program having at least one code section that keeps pixels from a first color space in the range of a second color space, wherein pixels have a color and brightness, the at least one code section being executable by a machine for causing the machine to perform steps comprising:
detecting when pixels in the first color space exceed the range of pixels in the second color space;
restricting the pixels in the first color space to the range of the second color space; and
wherein brightness of the restricted pixels is preserved, wherein the code for restricting the pixels comprises:
code for defining a sub-space within the first color space using a set of parameters, wherein defining the sub-space within the first color space further comprises determining values in the first color space that correspond to the boundaries of the sub-space; and
code for determining whether a pixel is outside the sub-space or inside the sub-space, wherein the sub-space approximates the range of the second color space and comprises values from the first color space that are outside the second color space.

17. The memory according to claim 16 wherein the code for restricting the pixels further comprises code for keeping the pixel unchanged when the pixel is inside the second color space, wherein the pixel inside the sub-space has brightness and color that do not visually deviate when mapped to the second color space.

18. The memory according to claim 16 wherein the code for restricting the pixels further comprises, when a pixel is outside the sub-space:
code for forcing the pixel to a new pixel in the sub-space, wherein the brightness and color of the new pixel is not visually deviated from the brightness and color of the pixel from the first color space; and
wherein the new pixel inside the sub-space has brightness and color that do not visually deviate when mapped to the second color space.

19. The memory of claim 16, wherein if the pixel is outside the sub-space, clipping the pixel to the sub-space.

20. The memory of claim 16, wherein the sub-space in the first color space is larger than a unit cube in RGB color space.

* * * * *